United States Patent [19]

Anderson

[11] 4,309,704

[45] Jan. 5, 1982

[54] MECHANISM OF IMPARTING ILLUSORY DOPPLER FREQUENCY CHARACTERISTICS TO A RERADIATED IMPINGING RADAR SIGNAL

[75] Inventor: Warren A. Anderson, Tiverton, R.I.

[73] Assignee: United States of America as represented by the Secretary of the Navy, Washington, D.C.

[21] Appl. No.: 629,187

[22] Filed: Nov. 5, 1975

[51] Int. Cl.³ .............................................. G01S 7/38
[52] U.S. Cl. ................................................. 343/18 E
[58] Field of Search ................................... 343/18 E

[56] References Cited

U.S. PATENT DOCUMENTS

| | | | |
|---|---|---|---|
| 3,039,092 | 6/1962 | Rychlik | 343/18 E |
| 3,142,060 | 7/1964 | Goldmark | 343/18 E |
| 3,277,476 | 10/1966 | Sabin et al. | 343/18 E |
| 3,878,525 | 4/1975 | Alpers | 343/18 E X |
| 3,891,989 | 6/1975 | Barney et al. | 343/18 E |
| 3,921,121 | 11/1975 | Huisveld, Jr. et al. | 343/18 E X |

*Primary Examiner*—Malcolm F. Hubler
*Attorney, Agent, or Firm*—Robert F. Beers; Arthur A. McGill

[57] ABSTRACT

A false Doppler shift is imparted on a received signal for confusing or disrupting the effective functioning of enemy fire control or target tracking signals. A radar repeater having a pair of antennae with associated amplifiers has both antennae visible to a remote radar. A frequency changer is interposed between the antennae for creating a shift in frequency that is to be returned to the enemy. The frequency changer can be either of the mechanical or electronic variety. A mechanical version utilizes a rotary probe driven by a reversible variable speed drive. An electronic version utilizes a sequence of electronic gates controlled by an electronic logic device under the control of a master oscillator.

2 Claims, 3 Drawing Figures

MECHANISM OF IMPARTING ILLUSORY DOPPLER FREQUENCY CHARACTERISTICS TO A RERADIATED IMPINGING RADAR SIGNAL

STATEMENT OF GOVERNMENT INTEREST

The invention described herein maybe manufactured and used by or for the Government of the United States of America for governmental purposes without the payment of any royalties thereon or therefore.

BACKGROUND OF THE DISCLOSURE

The present invention generally relates to countermeasure systems and more particularly to a system for confusing and/or disrupting the effective functioning of enemy fire control or target tracking radars by means of creating a false Doppler shift. The utility of such a system is clear. A moving target by imparting a false Doppler shift on a received signal, returns false information that creates an illusory opening or closing range rate for the enemy to follow.

It appears that prior to the present invention the techniques and/or mechanisms for achieving the above purposes were not a part of the United States of America's family of electronic countermeasures equipment.

SUMMARY OF THE INVENTION

It is therefore a general object and purpose of the present invention to provide a countermeasure device for protection of a moving target. It is a further object to create a signal that indicates a false opening or closing range of a target. Further objects are that the system be low in cost, rugged and utilize state-of-the-art hardware. These and other objects of the invention and the various features and details of construction and operation will become apparent from the specification and the drawings.

This is accomplished in accordance with the present invention by providing a system that intercepts an incoming signal. The signal is then amplified and transmitted to a frequency changer for providing a Doppler shift to the signal. The Doppler shifted signal is amplified and then retransmitted at a higher level that would swamp any signals returned by bouncing off of the target.

DESCRIPTION OF THE PREFERRED EMBODIMENTS

The present invention has particular utility on a moving target such as a ship or aircraft. The location of such targets can be determined by an enemy using Doppler shift techniques wherein a changed frequency is returned to a radar source location. The change in frequency is determinative of the change in opening or closing of range at which the target is moving. This description is of a system located at the target for providing false information to those receiving the return radar signals from the target.

Figure 1:
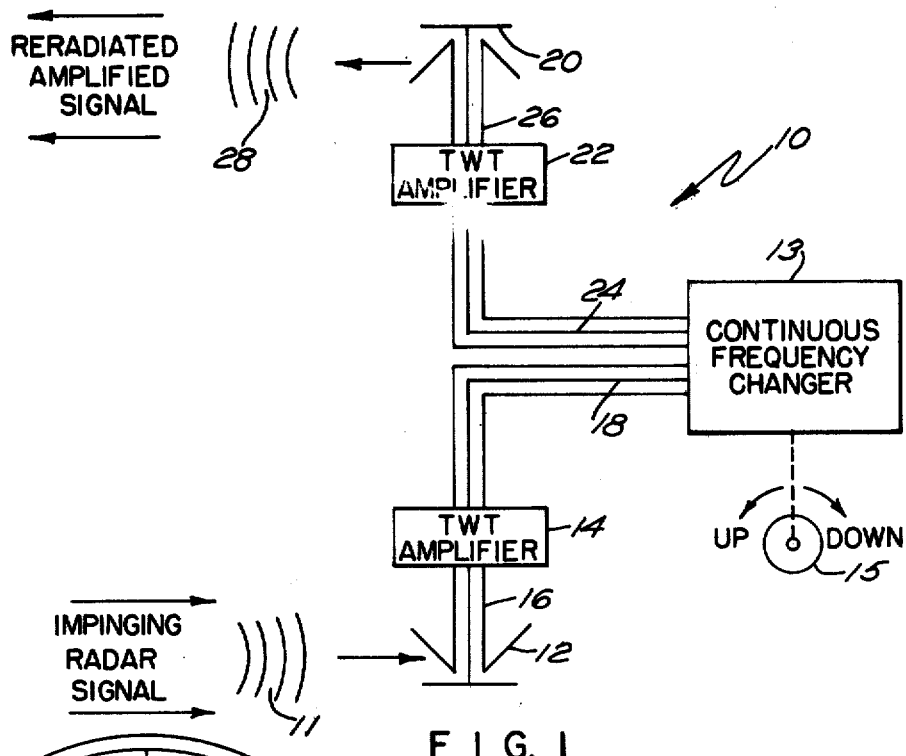
FIG. 1 is a block diagram showing an illustration of the present invention.

Referring now to FIG. 1 there is shown a system for retransmitting illusory Doppler frequency characteristics shown generally at 10. The system 10 is mounted to a moving target (not shown). Impinging radar signals 11 are received by a discone antenna 12 that transmits the signals to a continuous frequency changer 13 having a control knob 15. A traveling wave tube amplifier 14 and associated conductors 16 and 18 connect the discone antenna 12 to the frequency changer 13. The conductors used in this system are shown as coaxial cables but could just as well be waveguides etc. depending on circuit design. The control knob 15 determines the amount of frequency shift imparted to signal 11 and the direction of the shift whether up or down.

This new signal emanating from frequency changer 13 is then supplied to a transmitting discone antenna 20 via traveling wave tube amplifier 22 and associated conductors 24 and 26. Antenna 20 reradiates the new amplified signal 28 thereby providing false information.

The frequency changer 13 upon receiving as its input the amplified impinging radar signal 11 from traveling wave tube amplifier 14, adds or subtracts a controllable frequency increment and passes the changed frequency signal to traveling wave tube amplifier 22 via conductor 24. The changed frequency is strengthened by traveling wave tube amplifier 22 and passed to the transmit antenna 20 via conductor 26. The frequency increment, either fixed or changing with time, either added to or subtracted from the frequency of the impinging radar signal is the illusory Doppler that will confuse and/or disrupt the computation of a fire control solution at the tracking radar.

Figure 2:
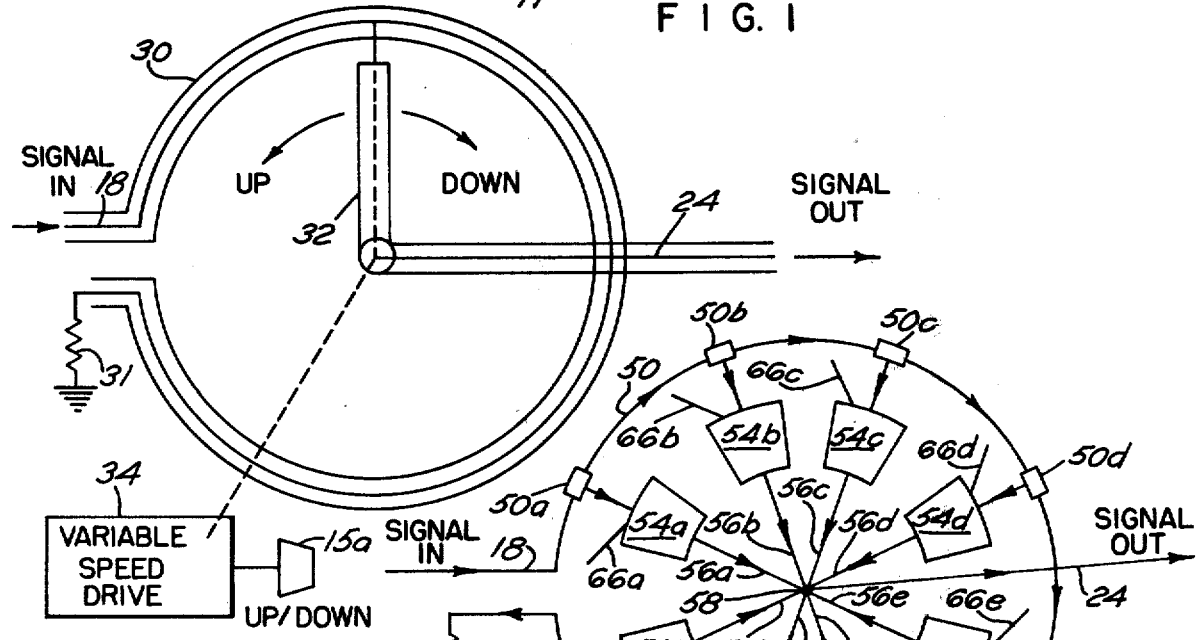
FIG. 2 is a diagrammatic representation of one form of the continuous frequency changer of FIG. 1.

FIG. 2 shows a mechanical embodiment of the frequency changer 13 of FIG. 1. A slotted coaxial cable 30 that is one wave length long is formed into a circle. The cable 30 has a resistive termination 31. A rotary probe 32 is operated by a reversible variable speed drive 34 with a control knob 15a. The coaxial cable 24 of FIG. 1 for conducting an output signal is connected to probe 32.

When the probe 32 is stationary there is no difference between the signal input and the signal output frequency. However, if the probe 32 is caused to rotate in a clockwise direction, it is seen that during the period of the complete turn of the probe, the output signal will have contained one less wave length than did the signal entering the frequency changer. Thus if the probe is rotating at 200 revolutions per second in a clockwise direction, the output frequency would be 200 Hz lower than the input. Conversely, if the probe were to be rotated at 200 revolutions per second in the counterclockwise direction, the output frequency would be 200 Hz higher than the signal entering the frequency changer. Higher probe rotation rates yield proportionately larger Doppler shifts.

Figure 3:
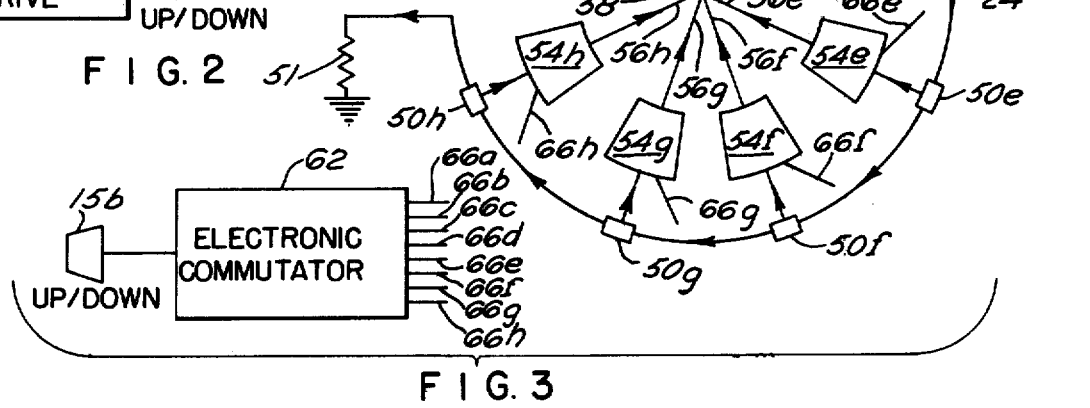
FIG. 3 is a diagrammatic representation of an alternate form of the continuous frequency changer of FIG. 1.

FIG. 3 shows an electronic embodiment of the frequency changer 13 of FIG. 1. A coaxial line 50 that is one wave length long is formed into a circle and tapped at points 50a–h around the circumference. The coaxial line 50 is shown as a single line for clarity. The number of points shown tapped is a representative number only and can be either more or less than shown. The line 50 is terminated through a resistor 51. Conductors 52a–h connect respective points 50a–h to respective gates 54a–h. Conductors 56a–h connect the outputs of respective gates 54a–h to a common terminal point 58. The conductor 24 of FIG. 1 (shown as a single line) is connected to terminal 58. An electronic commutator 62 having control knob 15b is provided for opening and closing gates 54a–h. The commutator 52 has output lines 66a–h for connecting to respective control terminals of gates 54a–h.

In operation the gates 54a–h will be sequentially closed and opened. The frequency and direction of operation will be determinative of the Doppler frequency shift as in the previous embodiment.

There has therefore been described an electronic counter-measure device suitable for providing protection against target tracking radar systems. The amount of Doppler shift to be employed is at the discretion of the user of the equipment as the present positions can be easily varied.

It will be understood that various changes in the details, materials, steps and arrangement of parts, which have been herein described and illustrated in order to explain the nature of the invention may be made by those skilled in the art within the principle and scope of the invention as expressed in the appended claims. For instance, the antennae used in the present invention could be log a periodic slot antennae which do not have omnidirectional characteristics but may be preferred due to installation requirements.

What is claimed is:

1. A system for imparting illusory Dopper frequency characteristics to a reradiated impinging radar signal comprising:
   a receiving antenna for receiving the impinging radar signal;
   frequency changing means connected to said receiving antenna for imparting the illusory Doppler frequency characteristics upon said radar signal, said frequency changing means comprises, a conductor of predetermined length, a resistor connected to terminate said conductor, a plurality of gates having respective input terminals, output terminals and control terminals with said input terminals connected to respective spaced points along said conductor and said output terminals being connected in common, and switching means having a plurality of outputs connected to respective control terminals of said plurality of gates for sequentially closing and opening said gates in a predetermined sequence at a predetermined rate; and
   a transmitting antenna connected to said frequency changing means for transmitting the radar signal containing the illusory Doppler frequency characteristics.

2. A system according to claim 1 further comprising:
   a first traveling wave tube amplifier connected between said receiving antenna and said frequency changing means;
   a second traveling wave tube amplifier connected between said frequency changing means and said transmitting antenna; and
   each of said receiving antenna and said transmitting antenna comprises a discone antenna.

* * * * *